(12) United States Patent
Kawamoto et al.

(10) Patent No.: US 10,086,817 B2
(45) Date of Patent: Oct. 2, 2018

(54) CONTROL DEVICE AND CONTROL METHOD FOR VEHICLE

(71) Applicant: JATCO Ltd, Fuji-shi, Shizuoka (JP)

(72) Inventors: Yoshinobu Kawamoto, Seoul (KR); Mamiko Inoue, Isehara (JP)

(73) Assignee: JATCO LTD, Fuji-Shi (JP)

(*) Notice: Subject to any disclaimer, the term of this patent is extended or adjusted under 35 U.S.C. 154(b) by 0 days.

(21) Appl. No.: 15/500,274

(22) PCT Filed: Mar. 12, 2015

(86) PCT No.: PCT/JP2015/057257
§ 371 (c)(1),
(2) Date: Jan. 30, 2017

(87) PCT Pub. No.: WO2016/017201
PCT Pub. Date: Feb. 4, 2016

(65) Prior Publication Data
US 2017/0210373 A1    Jul. 27, 2017

(30) Foreign Application Priority Data

Jul. 31, 2014 (JP) ................................ 2014-156379

(51) Int. Cl.
*B60W 10/10* (2012.01)
*B60K 6/485* (2007.10)
(Continued)

(52) U.S. Cl.
CPC .............. *B60W 10/06* (2013.01); *B60K 6/36* (2013.01); *B60W 10/10* (2013.01); *B60K 6/485* (2013.01); *B60K 6/543* (2013.01); *F02D 29/02* (2013.01)

(58) Field of Classification Search
CPC ......... B60W 10/06; B60W 10/10; B60K 6/36; B60K 6/485; B60K 6/543; F02D 29/02
See application file for complete search history.

(56) References Cited

U.S. PATENT DOCUMENTS

| 2002/0006848 A1 | 1/2002 | Tabata |
| 2003/0109360 A1* | 6/2003 | Eguchi ................... B60K 6/485 477/175 |

(Continued)

FOREIGN PATENT DOCUMENTS

| JP | 2002-340164 A | 11/2002 |
| JP | 2011-208697 A | 10/2011 |

(Continued)

*Primary Examiner* — Huan G Le
(74) *Attorney, Agent, or Firm* — Foley & Lardner LLP

(57) ABSTRACT

A control device for a vehicle is provided. The control device includes an automatic transmission constituted of a stepwise variable transmission mechanism configured to switch a plurality of shift stages by engagement and disengagement of a plurality of friction engaging elements, an engine as a driving source, a motor configured to assist a driving force of the engine, a hydraulic controller configured to supply a hydraulic pressure to control the engagement and the disengagement of the friction engaging element, and a control unit configured to control the automatic transmission to a target speed ratio through changing the shift stage of the stepwise variable transmission mechanism. The control unit performs a learning control that learns at least one of hydraulic pressure of the engagement and the disengagement of the friction engaging element, and inhibits the assist of the driving force to the engine by the motor in performing the learning control.

5 Claims, 4 Drawing Sheets

(51) Int. Cl.
*B60W 10/06* (2006.01)
*B60K 6/36* (2007.10)
B60K 6/543 (2007.10)
F02D 29/02 (2006.01)

(56) References Cited

U.S. PATENT DOCUMENTS

2009/0088290 A1* 4/2009 Tabata ................ F16H 61/0213
477/5
2009/0248265 A1* 10/2009 Tabata ................... B60K 6/365
701/59
2015/0142286 A1 5/2015 Waku et al.
2017/0159729 A1* 6/2017 Sakamoto ............. F16D 48/062

FOREIGN PATENT DOCUMENTS

JP 2014-004928 A 1/2014
WO WO-2013/187221 A1 12/2013

* cited by examiner

CONTROL DEVICE AND CONTROL METHOD FOR VEHICLE

TECHNICAL FIELD

The present invention relates to a control device and a control method for a vehicle with an automatic transmission.

BACKGROUND ART

JP2014-4928A discloses a driving device for a vehicle that includes an engine, a motor-generator, and a battery, such that the motor-generator is caused to generate a power to charge the battery, and the motor-generator is driven to start the engine and to perform a torque assist to the engine.

SUMMARY OF INVENTION

In an automatic transmission that engages and disengages a friction engaging element to change a shift stage, a learning control where an actual hydraulic pressure of engaging and disengaging the friction engaging element is learned to correct a hydraulic pressure is typically performed. The learning control of the hydraulic pressure is performed such that the friction engaging element detects a variation of a transmitted torque capacity and the actual hydraulic pressure.

In the learning control, when the torque assist of the motor-generator is performed to the engine as described above, an input torque of a transmission is varied to change a relation between the transmitted torque capacity and the actual hydraulic pressure in the friction engaging element, thus sometimes failing to accurately perform the learning control.

The present invention addresses the above-described problems, and it is an object of the present invention to provide a control device and a control method for a vehicle that ensure appropriately performing a learning control of a friction engaging element.

According to one aspect of the present invention, a control device for a vehicle is provided, which includes an automatic transmission constituted of a stepwise variable transmission mechanism configured to switch a plurality of shift stages by engagement and disengagement of a plurality of friction engaging elements, an engine as a driving source, a motor configured to assist a driving force of the engine, a hydraulic controller configured to supply a hydraulic pressure to control the engagement and the disengagement of the friction engaging element, and a control unit configured to control the automatic transmission to a target speed ratio through changing the shift stage of the stepwise variable transmission mechanism. The control unit performs a learning control that learns at least one of hydraulic pressure of the engagement and the disengagement of the friction engaging element, and inhibits the assist of the driving force to the engine by the motor in performing the learning control.

According to one aspect of the present invention, the assist of the motor is inhibited when the shift stage is changed in the case where the learning control of at least one of the engagement and the disengagement of the friction engaging element of the stepwise variable transmission mechanism is performed, thus preventing the assist torque from making the learning inaccurate, so as to prevent the occurrence of a shock and an abnormal noise during the shift in the case where the learning control of at least one of the engagement and the disengagement of the friction engaging element is performed.

DESCRIPTION OF EMBODIMENTS

The following describes embodiments of the present invention with reference to the drawings.

Figure 1:
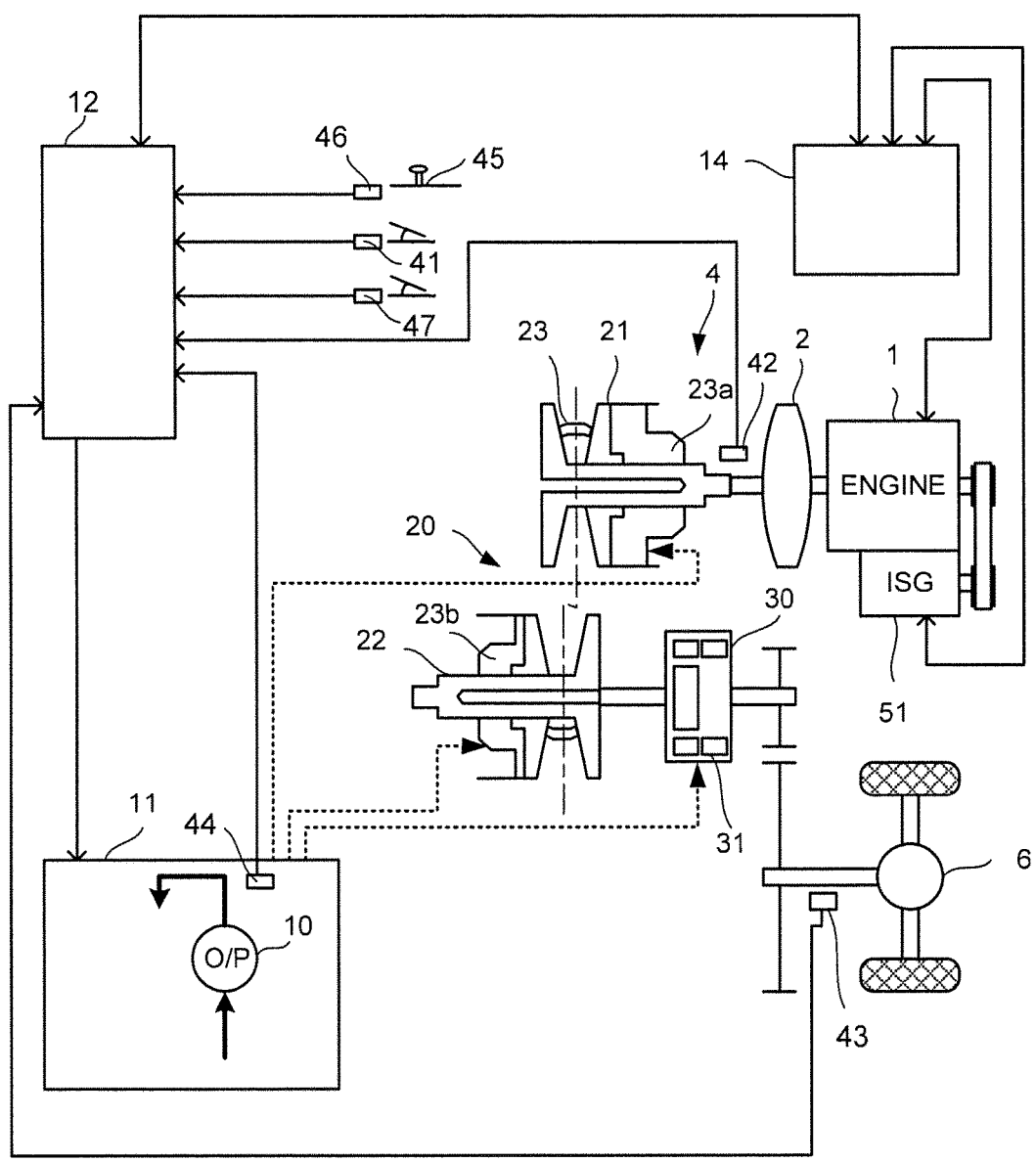
FIG. 1 is an explanatory view illustrating a configuration of a vehicle including a transmission according to an embodiment of the present invention.

FIG. 1 is an explanatory view illustrating a configuration of a vehicle including a transmission 4 of this embodiment. The vehicle includes an engine 1 as a power source. An output rotation of the engine 1 is transmitted to a drive wheel via a torque converter 2 with a lock-up clutch, an automatic transmission (hereinafter simply referred to as "the transmission 4"), and a final reduction gear 6.

The engine 1 includes an integrated starter/generator (Integrated Starter/Generator, hereinafter referred to as "ISG") 51. The ISG 51 is coupled to a crankshaft of the engine 1 via pulleys and a belt.

An engine controller (ECU) 14 controls an operation of the engine 1 and the ISG 51. In starting the engine 1, the ISG 51 is driven as a starter motor to crank the engine 1. In decelerating the vehicle, the ISG 51 is driven as an electric generator to regenerate a rotation of the crankshaft as electric power. During a traveling of the vehicle, the ISG 51 is driven as a motor to assist a driving force of the engine 1.

The vehicle includes an oil pump 10, which is driven with use of a part of the power of the engine 1, a hydraulic control circuit 11, which regulates a hydraulic pressure from the oil pump 10 to supply to each portion of the transmission 4, and a controller 12 that controls the hydraulic control circuit 11.

The transmission 4 includes a continuously variable transmission mechanism (hereinafter referred to as a "variator 20"), and a stepwise variable transmission mechanism (hereinafter referred to as a "sub-transmission mechanism 30") that is disposed on a downstream of the variator 20 in series with respect to the variator 20.

The variator 20 is a belt-type continuously variable transmission mechanism that includes a primary pulley 21, a secondary pulley 22, and a V belt 23 wound around over the pulleys 21, 22. The pulleys 21, 22 each include a fixed conical plate, a movable conical plate disposed to have a sheave surface in a state of opposing to the fixed conical plate so as to form a V groove with the fixed conical plate, and hydraulic cylinders 23a, 23b disposed on a back surface of the movable conical plate to axially displace the movable conical plate. Adjusting the hydraulic pressure supplied to the hydraulic cylinders 23a, 23b varies a width of the V groove to vary a contact radius of the V belt 23 with each of the pulleys 21, 22, thus steplessly varying a speed ratio vRatio of the variator 20.

The sub-transmission mechanism 30 is a transmission mechanism having two stages for forward and one stage for backward. The sub-transmission mechanism 30 includes a planetary gear mechanism and a plurality of friction engaging elements 31 (such as a Low brake, a High clutch, and a Rev brake) that change a linking state of the planetary gear mechanism.

Adjusting the supplied hydraulic pressure to the friction engaging elements 31 to change an engaging/disengaging state of the friction engaging element 31 changes a shift stage of the sub-transmission mechanism 30. For example, engaging the Low brake and disengaging the High clutch and the Rev brake makes the shift stage of the sub-transmission mechanism 30 a first speed. Engaging the High clutch and disengaging the Low brake and the Rev brake makes the shift stage of the sub-transmission mechanism 30 a second speed with the speed ratio smaller than the first speed. Engaging the Rev brake and disengaging he Low brake and the High clutch makes the shift stage of the sub-transmission mechanism 30 a backward movement.

To the controller 12, an output signal of an accelerator position sensor 41 that detects a degree of opening (hereinafter referred to as an "accelerator position APO") of an accelerator pedal, an output signal of a rotational speed sensor 42 that detects an input rotational speed (=a rotational speed of the primary pulley 21, hereinafter referred to as a "primary rotational speed Npri" of the transmission 4, an output signal of a rotational speed sensor 61 that detects an output rotational speed (=a rotational speed of the secondary pulley 22, hereinafter referred to as a "secondary rotational speed Nsec") of the variator 20, an output signal of a vehicle speed sensor 43 that detects a traveling speed (hereinafter referred to as a "vehicle speed VSP") of the vehicle, an output signal of an oil temperature sensor 44 that detects an oil temperature of the transmission 4, an output signal of an inhibitor switch 46 that detects a position of a select lever 45, an output signal of a brake switch 47 that detects a brake pedal to be stepped on, and similar signal are input.

The controller 12 decides a target speed ratio based on the input signals, generates a shift control signal for controlling the speed ratio of the variator 20 and the shift stage of the sub-transmission mechanism 30 with reference to such as a preliminarily recorded shift map such that the speed ratio (through speed ratio) of the entire transmission 4 follows the target speed ratio, and outputs the generated shift control signal to the hydraulic control circuit 11.

As described later, the controller 12 receives a drive start signal of the ISG 51 from the ECU 14, and transmits an operation inhibition signal of the ISG 51 to the ECU 14.

The hydraulic control circuit 11 adjusts a required hydraulic pressure from the hydraulic pressure generated in the oil pump 10 based on the shift control signal from the controller 12, so as to supply the hydraulic pressure to the each portion of the transmission 4. This varies the speed ratio of the variator 20 and the shift stage of the sub-transmission mechanism 30 to perform a shift of the transmission 4.

Figure 2:
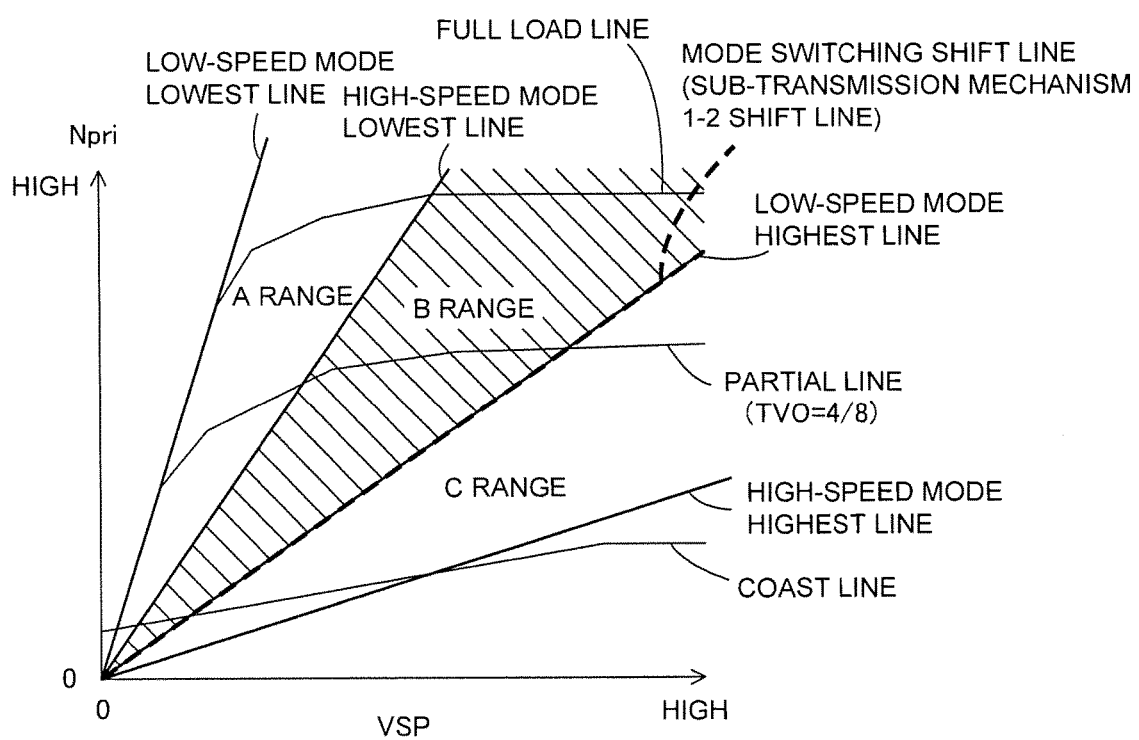
FIG. 2 is an explanatory view of an exemplary shift map according to the embodiment of the present invention.

FIG. 2 is an explanatory view of an exemplary shift map included in the controller 12 of this embodiment.

In the shift map, an operating point of the transmission 4 is preliminarily decided based on the vehicle speed VSP and the primary rotational speed Npri.

The speed ratio of the transmission 4 is an entire speed ratio obtained by multiplying the speed ratio of the variator 20 by that of the sub-transmission mechanism 30, and the entire speed ratio is hereinafter referred to as "the through speed ratio."

When the transmission 4 is in a low-speed mode, the sub-transmission mechanism 30 is in the first speed, and the shift is allowed in a low-speed mode ratio range between a low-speed mode Lowest line and a low-speed mode Highest line corresponding to the speed ratio of the variator 20. The operating point of the transmission 4 at the time moves inside an A region or a B region.

When the transmission 4 is in a high-speed mode, the sub-transmission mechanism 30 is in the second speed, and the speed ratio can be obtained in a high-speed mode ratio range between a high-speed mode Lowest line and a high-speed mode Highest line corresponding to the speed ratio of the variator 20. The operating point of the transmission 4 at the time moves inside the B region or a C region.

In the B region, the shift is allowed even if the sub-transmission mechanism 30 is in any of the first speed or the second speed. On the other hand, in a region exceeding the low-speed mode Highest line, the sub-transmission mechanism 30 is required to be in the second speed, thus a mode switching shift line that shifts the sub-transmission mechanism 30 from the first speed to the second speed is configured along the low-speed mode Highest line.

When the operating range is changed across the mode switching shift line, the controller 12 shifts the sub-transmission mechanism 30 from the first speed to the second speed, or from the second speed to the first speed.

On the shift of the sub-transmission mechanism 30, the speed ratio of the variator 20 is varied in a reverse direction to the variation of the speed ratio of the sub-transmission mechanism 30, so as to perform the shift to reduce the variation of the through speed ratio of the transmission 4. This shift can reduce an uncomfortable feeling of a driver due to the change of the input rotation speed caused by a level difference of the speed ratio of the sub-transmission mechanism 30.

In the embodiment of the present invention, the operation such that the variation of the through speed ratio is reduced as described above to perform the shift so as to make the variation of the speed ratio of the sub-transmission mechanism 30 and the variation of the speed ratio of the variator 20 in the reverse direction one another is referred to as a "cooperative shift." While the cooperative shift in this embodiment causes the speed ratio of the variator 20 to shift in the reverse direction to the sub-transmission mechanism 30 by the amount of the speed ratio corresponding to the variation amount of the speed ratio of the sub-transmission mechanism 30, a shift of the variator 20 where the through speed ratio varies may be employed.

It should be noted that, relating to operations of the controller 12 and the hydraulic control circuit 11, especially, the cooperative shift that simultaneously performs the shift control on the variator 20 and the sub-transmission mechanism 30, please refer to Japanese Unexamined Patent Application Publication No. 2012-57710 already applied by this applicant and published.

Next, a description will be given of a learning control of the friction engaging element 31 of the sub-transmission mechanism 30 according to the present invention.

In the sub-transmission mechanism 30, the shift stage is changed by engaging and disengaging of the plurality of the friction engaging elements 31. The friction engaging element 31 is controlled by the controller 12 so as to be engaged and disengaged by the hydraulic pressure supplied from the hydraulic control circuit 11.

Relating to the friction engaging element 31, in some cases, an actual torque transmission capacity of the friction engaging element 31 is different with respect to a command hydraulic pressure in engaging and disengaging due to such as machine tolerances, individual differences, and changes with time of a friction plate and a hydraulic chamber, or due to a variation of a viscosity of the hydraulic oil caused by the oil temperature. The difference of the actual torque transmission capacity of the friction engaging element 31 with respect to the command hydraulic pressure causes a shock and an abnormal noise in shifting.

Therefore, the controller 12 performs the learning control that learns the command hydraulic pressure in engaging and disengaging to correct.

Specifically, when the shift is performed in the sub-transmission mechanism 30, the controller 12 performs the learning such that the controller 12 determines the friction engaging element 31 to be disengaged based on a rotational speed difference between the input rotational speed and the output rotational speed in the sub-transmission mechanism 30, detects the command hydraulic pressure when it is determined to be disengaged, and uses the detected command hydraulic pressure as a disengaging hydraulic pressure at the next shift.

The controller 12 calculates the rotational speed difference in the sub-transmission mechanism 30 from the secondary rotational speed Nsec detected by the rotational speed sensor 61 and the vehicle speed VSP detected by the vehicle speed sensor 43. In this case, to the value detected by the vehicle speed sensor 43, a gear ratio at a subsequent stage of the sub-transmission mechanism 30 is considered.

In the learning control of the hydraulic pressure of the friction engaging element 31, conventionally, there have been the following problems.

The engine 1 includes the ISG 51, and for example, when the engine 1 is driven in such as requesting an acceleration, the ECU14 can drive the ISG 51 to assist the driving force of the engine 1.

When the ISG 51 assists the engine 1, the control is performed such that a sum of the driving forces of the engine 1 and the ISG 51 is identical to a case where only the engine 1 is driven for traveling.

Specifically, when the assist by the ISG 51 is performed during traveling with only the driving force of the engine 1, the driving force of the ISG 51 is gradually increased while the driving force of the engine 1 is gradually decreased, thus controlling the sum of the driving forces of the engine 1 and the ISG 51 so as not to suddenly vary.

Here, as described above, a learning process of the hydraulic pressure of the friction engaging element 31 is executed in the sub-transmission mechanism 30 in some cases.

In the shift map of FIG. 2, when the operating range is changed across the mode switching shift line, the controller 12 controls the engagement and the disengagement of the friction engaging element 31 in the sub-transmission mechanism 30 to perform the shift.

Before this shift, the controller 12 detects the rotational speed difference between the input and output shafts of the sub-transmission mechanism 30 with respect to the command hydraulic pressure in the control of the disengagement of the friction engaging element 31, and records the command hydraulic pressure when a predetermined rotational speed difference is detected, thus executing the learning control of the hydraulic pressure used for the next shift control.

Thus, performing the learning control of the hydraulic pressure of the friction engaging element 31 reduces a deviation between the command hydraulic pressure and the actual torque transmission capacity of the friction engaging element 31, so as to prevent from the occurrence of the shock and the abnormal noise during the shift.

As described above, the learning control of the sub-transmission mechanism 30 is performed when the shift of the sub-transmission mechanism 30 is executed.

Now, in performing the learning control, as described above, when an assisting force by the ISG 51 is applied in addition to the driving force of the engine 1, the input torque to the transmission 4 varies. When the input torque to the transmission 4 varies, a torque input to the friction engaging element 31 also varies to make a timing to detect the rotational speed difference different even if the command hydraulic pressure is identical, so as to fail to accurately detect the command hydraulic pressure for detecting the rotational speed difference.

Therefore, when the assist by the ISG 51 is performed, it is preferable not to perform the learning of the friction engaging element 31.

On the other hand, as indicated in the shift map of FIG. 2, during the vehicle travels, the shift of the sub-transmission mechanism 30 is performed when the operating range is changed across the mode switching shift line. On the shift map, the sub-transmission mechanism 30 is controlled so as not to perform the shift as much as possible because the control of the through speed ratio of the transmission 4 by the variator 20 provides a better fuel efficiency of the vehicle.

Therefore, inhibiting the learning of the friction engaging element 31 during performing the assist by the ISG 51 further reduces opportunities for performing the learning control in the sub-transmission mechanism 30 with a low frequency of the shift to be performed.

Then, in the embodiment of the present invention, when the learning control is performed during the execution of the shift of the sub-transmission mechanism 30, an assist inhibition control that inhibits the operation of the ISG 51 is executed.

Figure 3:
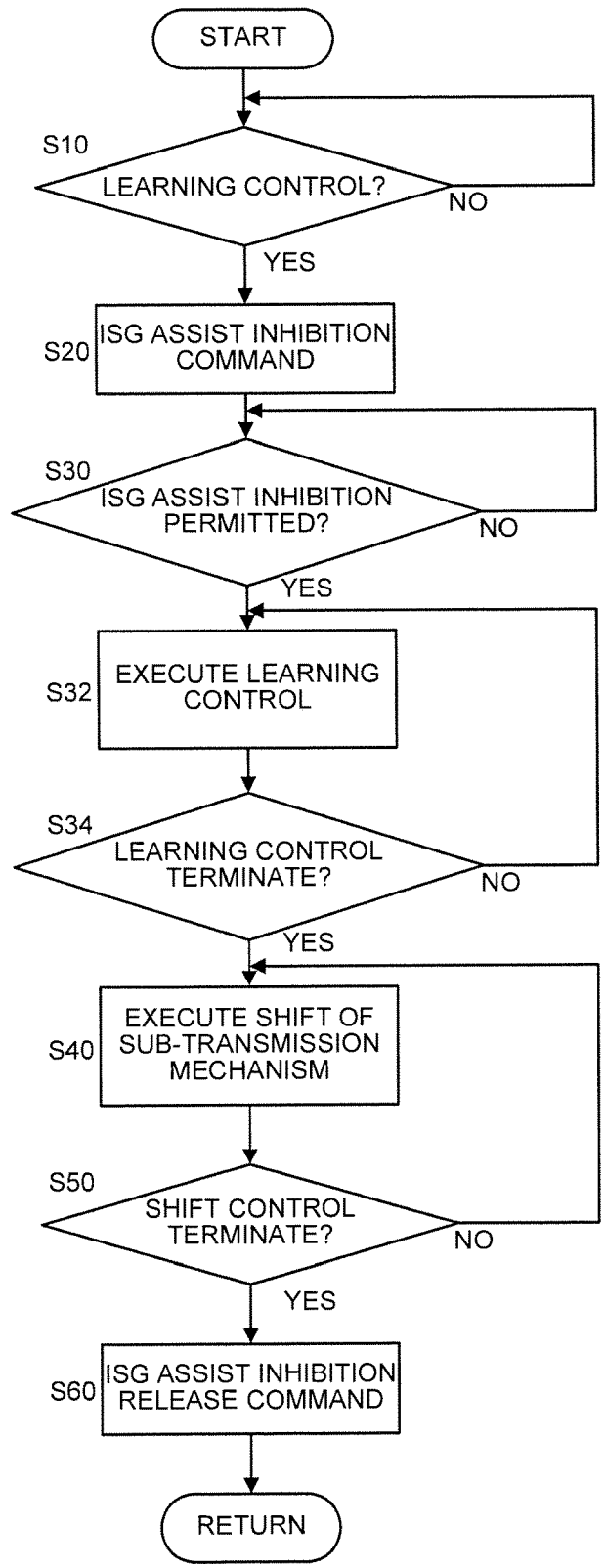
FIG. 3 is a flowchart of a learning control according to the embodiment of the present invention.

FIG. 3 is a flowchart of the learning control of the transmission 4 executed by the controller 12 of this embodiment.

In Step S10, the controller 12 determines whether or not the sub-transmission mechanism 30 shift operation is executed to perform the learning control. On the shift map indicated in FIG. 2, when the operating range is changed across the mode switching shift line, the shift of the sub-transmission mechanism 30 is determined to be executed, so as to proceeds to Step S20. When the learning control is not executed, the controller 12 repeats Step S10 to stand by.

In Step S20, the controller 12 transmits an assist inhibition command that inhibits the assist of the ISG 51 to the ECU 14 before the execution of the shift operation. The ECU 14 replies an inhibition permission signal with respect to the assist inhibition command transmitted from the controller 12 when the ECU 14 permits the inhibition of the assist of the ISG 51. In Step S30, the controller 12 waits until receiving the assist inhibition permission signal from the ECU 14.

When the controller 12 receives the assist inhibition permission signal from the ECU 14, the controller 12 performs the learning control of the command hydraulic pressure of the disengagement of the friction engaging element 31 in Step S32. In Step S34, the controller 12 waits for the termination of the learning control. In the learning control, the controller 12 stores the command hydraulic pressure at the point when the rotational speed difference occurs. The stored command hydraulic pressure is used for the next shift control. When the learning control terminates, the controller 12 executes the shift control of the sub-transmission mechanism 30 in Step S40.

The controller 12 waits for the termination of the shift control in Step S50. When the shift control terminates, the controller 12 transmits an assist inhibition release command that releases the inhibition of the assist of the ISG 51 to the ECU 14.

Subsequently, the ECU 14 executes the assist control of the ISG 51 based on the request from the driver.

Figure 4:
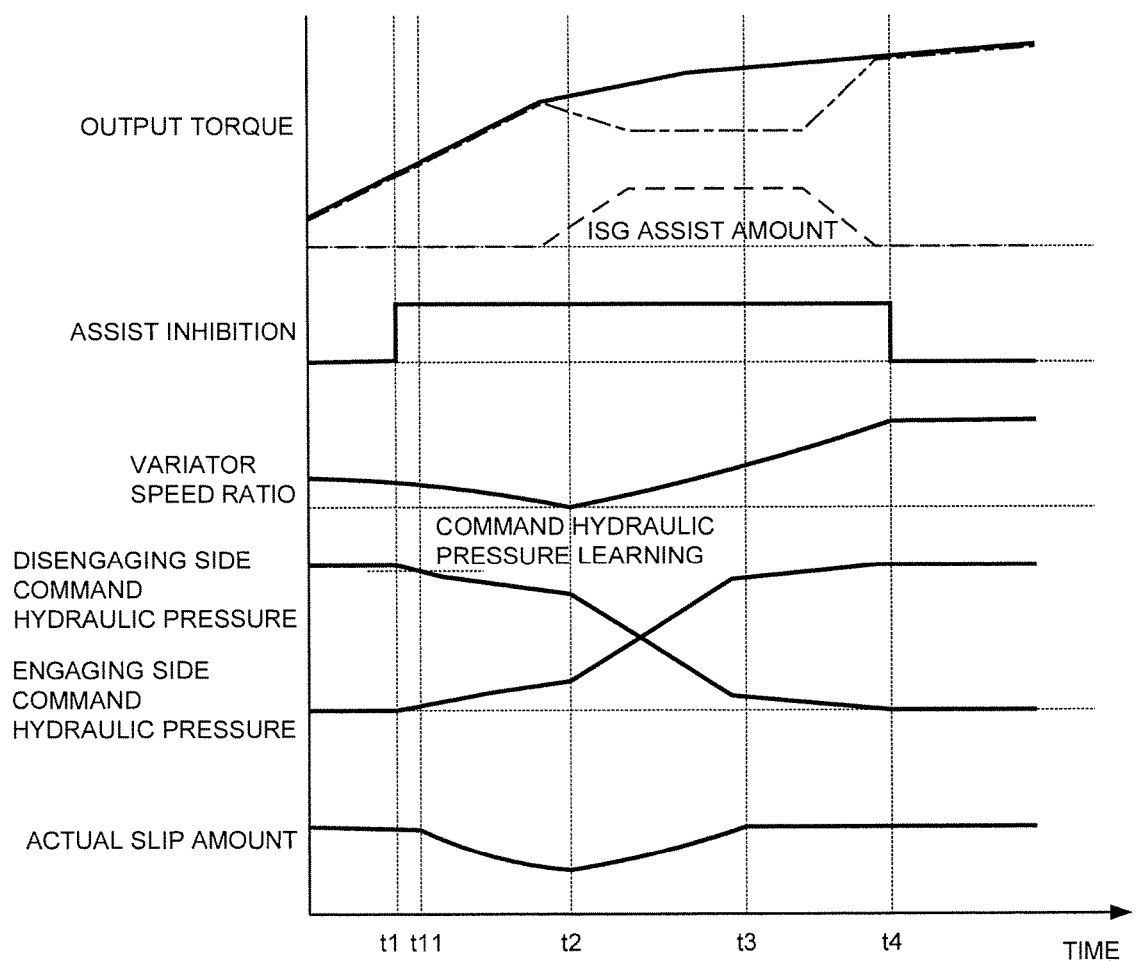
FIG. 4 is a timing chart of the learning control according to the embodiment of the present invention.

FIG. 4 is a timing chart of the learning control of the transmission 4 executed by the controller 12 of the embodiment.

The timing chart indicated in FIG. 4 includes lines of the output torques of the engine 1 and the ISG 51, the assist inhibition signal output by the controller 12, the speed ratio vRatio of the variator, the command hydraulic pressure of the friction engaging element of the disengaging side, the command hydraulic pressure of the friction engaging element of the engaging side, and an actual slip amount (calculated from the rotational speed difference in the sub-transmission mechanism 30, the secondary rotational speed Nsec detected by the rotational speed sensor 61, and the vehicle speed VSP detected by the vehicle speed sensor 43) in the sub-transmission mechanism 30, from the top line with a time axis as a horizontal axis.

In the timing chart of the output torque, the output torque of the engine 1 is indicated by a one dot chain line, and the output torque of the ISG 51 is indicated by a broken line.

When the assist by the ISG 51 is performed, the ECU14 decreases the torque of the engine 1 while increasing the torque of the ISG 51, so as not to vary the sum of an output torque of the engine 1 and the ISG 51. When the assist by the ISG 51 is terminated, the ECU14 decreases the torque of the ISG 51 while increasing the torque of the engine 1.

In this embodiment, when the controller 12 transmits the assist inhibition command, the assist of the ISG 51 is not executed, and as indicated by the solid line in FIG. 4, the torque of only the engine 1 is output.

When the operating range is changed across the mode switching shift line, the controller 12 starts (time point t1) the learning control of the command hydraulic pressure of the disengagement of the friction engaging element 31 based on the predetermined condition (such as a case where the mode switching shift line is crossed for the first time after an ignition-on). At this time, the controller 12 transmits the assist inhibition command that inhibits the assist of the ISG 51 to the ECU14 before the start of the learning control of the friction engaging element 31.

The ECU 14 receives the assist inhibition command and inhibits the assist of the ISG 51.

After the assist of the ISG 51 is inhibited, the controller 12 executes the learning control of the friction engaging element 31. Subsequent to the termination of the learning control of the friction engaging element 31, the shift of the sub-transmission mechanism 30 is started (time point t11).

In the learning control, specifically, the controller 12 gradually decreases the command hydraulic pressure of the friction engaging element 31 of the disengaging side to store the command hydraulic pressure at a time point (time point t11) where the rotational speed difference between the input rotational speed and the output rotational speed in the sub-transmission mechanism 30 occurs, thus performing the learning of the command hydraulic pressure of the friction engaging element 31 of the disengaging side. The stored command hydraulic pressure is used for the next shift control.

Next, for the shift of the sub-transmission mechanism 30, the controller 12 increases the command hydraulic pressure of the friction engaging element 31 of the engaging side while decreasing the command hydraulic pressure of the friction engaging element 31 of the disengaging side, thus changing over the friction engaging elements 31 (time points t2 to t3). This varies the speed ratio in the sub-transmission mechanism 30. The controller 12 simultaneously varies the speed ratio of the variator 20 in the reverse side of the variation of the speed ratio of the sub-transmission mechanism 30, so as to control the through speed ratio of the transmission 4 not to be varied.

When the changing over of the friction engaging elements 31 of the sub-transmission mechanism 30 is completed (time point t3), the controller 12 outputs the command hydraulic pressure where the friction engaging element 31 of the engaging side can maintain a fully engaged state, so as to complete the shift of the sub-transmission mechanism 30.

After the shift of the sub-transmission mechanism 30 is completed, the controller 12 releases the assist inhibition of the ISG 51 (time point t4).

Thus the control indicated in FIG. 4 inhibits the assist by the ISG 51 when the learning control, which is performed before the shift of the sub-transmission mechanism 30, of the command hydraulic pressure of the friction engaging element 31 of the disengaging side is executed, so as to ensure accurately performing the learning control of the command hydraulic pressure of the disengagement of the friction engaging element 31.

As described above, in the embodiment of the present invention, in the control device of the automatic transmission that includes the transmission 4 constituted of the sub-transmission mechanism 30 as a stepwise variable transmission mechanism, which is configured to switch the plurality of the shift stages by engaging and disengaging the plurality of the friction engaging elements 31, the engine 1 as a driving source, the ISG 51 as a motor that assists the driving force of the engine 1, the hydraulic control circuit 11 as the hydraulic controller that supplies the hydraulic pressure to control the engagement and the disengagement of the friction engaging element 31, and the controller 12 as a control unit that changes the shift stage of the sub-transmission mechanism 30 to control the transmission 4 to a target speed ratio, the controller 12 performs the learning control that learns at least one of hydraulic pressure of the engagement and the disengagement of the friction engaging element 31 and inhibits the assist of the driving force to the engine 1 by the ISG 51 in performing the learning control.

In the embodiment of the present invention, since this configuration inhibits the assist of the ISG 51 in performing the learning control at the disengagement of the friction engaging element 31 of the sub-transmission mechanism 30, the assist torque is prevented from making the learning inaccurate in the case where the learning control at the engagement and the disengagement of the friction engaging element 31 is performed in changing the shift stage of the sub-transmission mechanism 30, thus preventing from the occurrence of the shock and the abnormal noise during the shift.

Furthermore, the transmission 4 is coupled to the sub-transmission mechanism 30 as the stepwise variable transmission mechanism in series and includes the variator 20 as the continuously variable transmission mechanism configured to steplessly change the speed ratio. Since the controller 12 performs the learning control that learns the hydraulic pressure of the disengagement of the friction engaging element 31 in changing the shift stage of the sub-transmission mechanism 30, and inhibits the assist of the driving force to the engine 1 by the ISG 51 in performing the learning control, the learning of the command hydraulic pressure of the disengagement of the friction engaging element 31 can be accurately performed, and further, since opportunities of performing the learning control can be prevented from being decreased, the deviation between the command hydraulic pressure and the actual torque transmission capacity of the friction engaging element 31 can be decreased to prevent from the occurrence of the shock and the abnormal noise during the shift.

Furthermore, the ECU 14 as an engine control unit that controls the operation of the engine 1 and the ISG 51 is disposed. Since the controller 12 transmits the command that inhibits the assist of the driving force to the engine 1 by the ISG 51 to the ECU 14 in changing the shift stage of the sub-transmission mechanism 30, the assist of the ISG 51 can be inhibited in changing the shift stage of the sub-transmission mechanism 30 even in the configuration where the control of the engine 1 and the ISG 51 and the control of the transmission 4 are performed by different control devices, thus preventing the assist torque from making the learning inaccurate, so as to prevent from the occurrence of the shock and the abnormal noise during the shift.

The embodiments of the present invention described above are merely illustration of some application examples of the present invention and not of the nature to limit the technical scope of the present invention to the specific constructions of the above embodiments.

While the above-described embodiment has described about the transmission 4 that includes the variator 20 and the sub-transmission mechanism 30, even a configuration that includes a stepwise variable transmission mechanism alone is similarly applicable.

While the above-described embodiment includes the belt-type continuously variable transmission mechanism as the variator 20, the variator 20 may be a continuously variable transmission mechanism where the chain is wound around over the pulleys 21, 22 instead of the V belt 23. Alternatively, the variator 20 may be a toroidal type continuously variable transmission mechanism where a tiltable power roller is disposed between an input disk and an output disk.

While the above-described embodiment includes the sub-transmission mechanism 30 as the variable transmission mechanism with the shift stages for the forward movement of two stages of the first speed and the second speed, the sub-transmission mechanism 30 may be disposed as a variable transmission mechanism with the shift stages of three or more stages as the shift stages for the forward movement.

While the above-described embodiment is configured to execute the learning control of the friction engaging element 31 of the disengaging side, the learning control of the friction engaging element 31 of the engaging side may be executed, and the configuration where the learnings of the friction engaging elements 31 of the disengaging side and the engaging side are each executed before the shift control may be employed. In any cases, the disengagement or the engagement can be determined by the variation of the actual slip amount.

This application is based on and claims priority to Japanese Patent Application No. 2014-156379 filed in Japan Patent Office on Jul. 31, 2014, the entire content of which is incorporated herein by reference.

The invention claimed is:

1. A control device for a vehicle, comprising:
    an automatic transmission comprising a stepwise variable transmission mechanism to switch a plurality of shift stages by changing a combination of engagement and disengagement of a plurality of friction engaging elements, and a continuously variable transmission mechanism coupled to the stepwise variable transmission mechanism in series and to steplessly change a speed ratio;
    an engine as a driving source;
    a motor to assist a driving force of the engine;
    a hydraulic controller to supply a hydraulic pressure to control the engagement and the disengagement of a friction engaging element of the plurality of friction engaging elements; and
    a control unit to control the automatic transmission to a target speed ratio through changing a shift stage of the stepwise variable transmission mechanism, wherein:
    the control unit is configured to perform a learning control that learns at least one of a hydraulic pressure of the engagement or the disengagement of the friction engaging element in changing the shift stage of the stepwise variable transmission mechanism, and
    the control unit is configured to inhibit an assist of the driving force to the engine by the motor in performing the learning control.

2. The control device for the vehicle according to claim 1, comprising:
    an engine control unit to control operation of the engine and the motor, wherein
    the control unit is configured to perform, in changing the shift stage of the stepwise variable transmission mechanism, the learning control that learns at least one of the hydraulic pressure of the engagement or the disengagement of the friction engaging element, and transmit a command that inhibits the assist of the driving force to the engine by the motor to the engine control unit.

3. The control device for the vehicle according to claim 1, wherein the control unit is configured to perform the learning control such that, in a case where the motor assists the driving force of the engine, a sum of driving forces of the engine and the motor is identical to a case where only the engine is driven for traveling.

4. A control method for a vehicle including an automatic transmission comprising a stepwise variable transmission mechanism to switch a plurality of shift stages by changing a combination of engagement and disengagement of a plurality of friction engaging elements, and a continuously variable transmission mechanism coupled to the stepwise variable transmission mechanism in series and to steplessly change a speed ratio, an engine as a driving source, a motor to assist a driving force of the engine, a hydraulic controller to supply a hydraulic pressure to control the engagement and the disengagement of a friction engaging element of the plurality of friction engaging elements, and a control unit to control the automatic transmission to a target speed ratio through changing the speed ratio of the continuously variable transmission mechanism and the shift stage of the stepwise variable transmission mechanism, the control method comprising:
    when a shift stage of the stepwise variable transmission mechanism is changed, performing a learning control that learns at least one of a hydraulic pressure of the engagement or the disengagement of the friction engaging element, and inhibiting an assist of the driving force to the engine by the motor.

5. A control device for a vehicle, comprising:
    an automatic transmission comprising a stepwise variable transmission mechanism to switch a plurality of shift stages by changing a combination of engagement and disengagement of a plurality of friction engaging elements, and a continuously variable transmission mechanism coupled to the stepwise variable transmission mechanism in series and to steplessly change a speed ratio;

an engine;

a motor capable of assisting a driving force of the engine;

a hydraulic control circuit that supplies a hydraulic pressure to control the engagement and the disengagement of a friction engaging element of the plurality of friction engaging elements; and control means for controlling the automatic transmission to a target speed ratio through changing a shift stage of the stepwise variable transmission mechanism, wherein:

the control means performs a learning control that learns at least one of a hydraulic pressure of the engagement or the disengagement of the friction engaging element in changing the shift stage of the stepwise variable transmission mechanism, and inhibits an assist of the driving force to the engine by the motor in performing the learning control.

* * * * *